United States Patent [19]

Long et al.

[11] 4,419,454

[45] Dec. 6, 1983

[54] RAPID-FIRE REFRACTORIES

[75] Inventors: William G. Long, Lynchburg; Helen H. Moeller, Concord, both of Va.

[73] Assignee: The Babcock & Wilcox Company, New Orleans, La.

[21] Appl. No.: 329,903

[22] Filed: Dec. 14, 1981

[51] Int. Cl.$^3$ ............................................. C04B 35/80
[52] U.S. Cl. .................................... 501/95; 501/124; 106/85; 106/99; 106/104
[58] Field of Search ................................ 106/85–90, 106/99, 104; 501/81–83, 124, 127, 95

[56] References Cited

U.S. PATENT DOCUMENTS

| | | | |
|---|---|---|---|
| 2,063,102 | 12/1936 | Jones | 501/81 |
| 2,224,459 | 12/1940 | Matheny | 501/83 |
| 2,278,957 | 4/1942 | Walker et al. | 501/83 |
| 3,591,395 | 7/1971 | Zonsveld et al. | 106/90 |
| 3,645,961 | 2/1972 | Goldfein | 106/90 |
| 3,982,953 | 9/1976 | Ivarsson et al. | 501/127 |

*Primary Examiner*—James Poer
*Attorney, Agent, or Firm*—Robert J. Edwards; J. H. Muetterties; M. B. Quatt

[57] ABSTRACT

Water containing refractories which inhibit or eliminate the tendency of explosive spalling are provided by mixing solid organic fibers into the refractory mix. The refractory mix may be used in castables, plastics, ramming or gunning mixes or mortars.

12 Claims, No Drawings

RAPID-FIRE REFRACTORIES

BACKGROUND OF THE INVENTION

This invention relates to improved water containing refractories (WCR) utilizing the addition of solid organic fibers to reduce or eliminate the tendency of explosive spalling as found in castables, plastics, ramming mixes and mortars.

Explosive spalling of a refractory material sometimes occurs during the initial heating of a water containing refractory wherein the water containing refractory experiences cracking or total disintegration. Explosive spalling is related to steam entrapment in the refractory material. The tendency of the water containing refractory material to explosively spall depends on the type of refractory, the type of binder used in the WCR, the amount of binder, the amount of water, the heating schedule, and the ambient temperature during fabrication. One way to prevent explosive spalling is to use heat-up rates which provide sufficient time for the water and steam to escape the refractory material. Another way to accomplish this is by manually creating channels within the refractory mass before the drying process which provide a means for the water to escape.

If the initial heating rate of the WCR is reduced the tendency of the refractory to explosively spall can be reduced or eliminated. However, heat intensive industries face economic penalties due to extended downtime to initially heat the WCR or face the problem of equipment limitations wherein fast heat-up rates cannot be accommodated. Therefore, it is advantageous to attempt to dry the WCR as fast as possible, i.e., rapid-firing wherein the WCR is dried at a high degrees per hour rate.

Some refractories have been formed with large pre-existing channels either created manually or by the addition of channel forming elements, which make it possible for the moisture to escape at a time preceding and after burnout of the channel-forming elements. Evidently the large preexisting channels were found necessary to remove the water from the WCR. These channels are large in the sense that they are too large (approximately 100 microns or greater) to create capillary action within the WCR and hence rely primarily on diffusion during drying to cause fluid and/or gas flow out of the refractory mass.

It was previously thought that the channel-forming material should be highly absorbent in order to absorb and concentrate the water within the material which forms the channel. There exists spalling resistant refractories incorporating an absorbent channel-forming element, i.e., wheat straw. However, non-absorbent channel-forming material, such as plastic sipping straws, have also been used. When mixed with the refractory mass these materials automatically provided large, internal channels through which the water can escape. In the case of wheat-straw the water can enter its channel by either permeating through the wheat-straw material itself or it can enter one of the two channel openings. In the case of plastic sipping straws, the water must enter through one end of the straw and exit via the other openfaced end. During the drying stage water travels through the channel primarily by diffusive action, due to the pressure differential in the channels since the channels are too large to effect capillary action within the channel. At some temperature over 212° F. (100° C.) the channel-forming material will burn out leaving a larger refractory-defining channel (the channel remaining after the straw has burned out.) Thereafter the entrapped steam will escape the WCR through the refractory-defining channels. WCR made under these conditions experience a substantial loss in strength and a reduced resistance to molten metal or slag attack as compared to conventional WCR.

The use of channels to remove moisture from a refractory mass is discussed in U.S. Pat. No. 3,982,953 (IVARSSON et al) which discloses the addition of straw-shaped, channel-forming elements to a refractory mass for the purpose of automatically creating channels in order to allow moisture to escape. The removal of entrapped water is through these elements by diffusive action. U.S. Pat. No. 2,224,459 (MATHENY) discloses the addition of 1–50% by weight shredded or comminuted paper for the purpose of producing a lightweight refractory. Drying is enhanced by the capillary action created throughout the fiber of the paper. U.S. Pat. No. 3,591,395 (ZONSVELD et al) discloses the addition of polypropylene fibers to a water-hardenable mass for the purpose of resisting material cracking and adding flexural strength to the casting. The mass is not subjected to firing nor are the fibers burned out. The water hardenable mass relies on the presence of the fibers to provide enhanced strength.

SUMMARY OF THE INVENTION

Accordingly, the problem of explosive spalling has been solved by the present invention in a simple and effective way by using solid organic fibers to create a means for the moisture removal in a refractory mass. The fibers, for example, polypropylene fibers readily and randomly disperse when mixed with the refractory mass. The fibers create small interconnecting passageways between the existing matrix of moisture pores.

The polypropylene fibers of approximately 15 microns in diameter are preferably cut into lengths of approximately ¼ inch (0.64 cm) though fibers having a length to diameter ratio of about 850:1 have been used successfully. Fibers of this length are found especially suitable because they do not cause interference in the application process, and while in combination with pores in the WCR provide a network of interconnecting channels. Hence moisture trapped deep within the WCR mass will travel by capillary action along one annular channel until it interconnects with another annular channel or pore; continuing in this manner until it finds its way to the face of the refractory mass.

The addition of solid polypropylene fibers to the refractory mass effects moisture removal by a means different than that taught by the prior art. Electron microscopy has shown that small annular passageways or channels form about each polypropylene fiber. These annular channels have been determined to be of a thickness of approximately one micron. It is these channels which provide the means for the critical moisture removal. In channels of such a small size the water is drawn along the fiber primarily by capillarity; i.e., the action by which the surface of a liquid, where it contacts a solid, is elevated or depressed because of the relative attraction of the molecules of the liquid for each other and for those of the solid. Hence, water removal from WCR containing these fibers is primarily influenced by two forces; i.e., pressure differential and capillary action.

Before and during the initial phase of heat-up (rapid-firing), water is drawn out of the WCR by capillary and diffusive action through a network of connecting pores in the WCR and annular spaces which have been formed around the polypropylene fibers. At a critical temperature and pressure, the water will vaporize to steam. At that point, the steam will escape through the same network of connecting moisture pores and annular channels. At approximately 300° F., the polypropylene fiber begins to soften. As the temperature rises, the fiber will melt at approximately 330° F. and eventually decompose at 550° F. leaving channels through which any remaining moisture in the WCR can escape.

The resultant refractory mass experiences no compromise in physical or mechanical properties and is therefore enhanced. These results are improvements over the present state of the art since the addition of channel-forming elements to castables or the creating of channels therein have necessarily meant a substantial reduction of final strength and density and other physical properties.

Placement of the refractory mass must sometimes take place during conditions which are not considered ideal. It is known that the tendency of a refractory mass to explosively spall increases with a decrease in ambient temperature. Utilization of the present invention has shown that favorable results are obtained even if placement takes place at 40° F.

It is an object of this invention to provide an effective means to eliminate explosive spalling of a refractory mass without compromising the resultant mass's properties.

It is another object of this invention to provide an easy and effective means to reduce or eliminate explosive spalling of any WCR mass.

DETAILED DESCRIPTION OF THE PREFERRED EMBODIMENT

Tests were conducted with high purity calcium aluminate since it is well known in the art that high purity calcium aluminate cements experience the worst case of explosive spalling.

EXAMPLE 1

A refractory mass comprised of KAOTAB 95, the trademark for a calcium aluminate mix of The Babcock & Wilcox Company, polypropylene fibers, 15 microns in diameter and ¼ inch long, and water were mixed. Blocks (9"×9"×9") were prepared using the above mixture. The amount of the polypropylene fiber was varied in each casting (1.573 weight percent, 0.633 weight percent and 0.215 weight percent). In each trial a block of KAOTAB without fibers was cast as a control. No extra water was required when 0.215 weight percent of fiber was added. However, mixes containing both the 0.633 and 1.573 weight percent of fiber needed extra water for control of flowability.

All specimens were cured overnight. Table 1 shows the firing schedule used:

TABLE I

| HEAT-UP SCHEDULE OF FURNACE | |
|---|---|
| Degrees Per Hour | Temperature °F. |
| 400 | RT to 900 |
| 2800 | 900 to 1600 |

At 1600° F. the furnace was shut down. After cooling, the blocks were removed from the furnace. With each subsequent test the positions of the blocks were alternated to confirm that results were due to fiber addition and not to the position in the furnace.

In all the tests the blocks of KAOTAB without polypropylene fiber had explosively spalled while the blocks of KAOTAB containing polypropylene fiber did not explosively spall. Tests were terminated at 1600° F., since severe damage was produced at that temperature in the KAOTAB concrete without the polypropylene fibers.

EXAMPLE 2

Two panels (18"×18"×5") of a standard 95% alumina castable one containing high levels of calcium aluminate binder and the other containing high levels of calcium aluminate binder plus 0.2 weight percentage of polypropylene fibers were placed into furnace doors after being cast and then cured overnight under a plastic cover. The furnace door panels were immediately fired at a rate of 1000 degrees F. per hour to a temperature of 2250° F. (1232° C.). The standard castable without the fiber exploded violently at 1800° F. (982° C.), wherein the one containing the polypropylene fibers withstood the rapid-firing without any damage.

EXAMPLE 3

Samples (9"×4½"×2½") of a 95% alumina, calcium aluminate containing castable were cast with levels of 0.05, 0.10 and 0.20 weight percentage of polypropylene fibers, and along with samples cast without polypropylene fiber as a control. Each sample was cast with cold water at about the same temperature and cured at a temperature of 40° F. to simulate actual cold weather field conditions. After curing for more than 24 hours the cold samples were immediately inserted into a furnace preheated to 2500° F. After exposure to the furnace temperature, all of the control samples exploded while all samples containing polypropylene fibers did not.

EXAMPLE 4

A standard 95% alumina gun mix and the same mix with 0.2 weight percentage of polypropylene fibers were gunnited at the same prewet, ambient temperature and slake time. The density of the gunned mix containing polypropylene fiber was 166 lbs./cu.ft. as compared to 161 lbs/cu.ft. for the standard gunned mix. The modulus of rupture was increased from 1100 psi to 1380 psi. It was found that the amount of material which rebounded was affected by the addition of polypropylene fibers; the standard mix exhibited 33% rebound while the mix with polypropylene fibers exhibited 26% rebound.

EXAMPLE 5

Two types of plastic refractories, sold under the trademarks KAOLITH 85PB and KAOLITH 80AS, both manufactured by The Babcock & Wilcox Company, were mixed with and without polypropylene fibers. KAOLITH 85PB is an 85 percent alumina, phosphate bonded plastic refractory and KAOLITH 80AS is an 80 percent alumina air setting plastic refractory. Blocks (9"×9"×9") and bricks (2½"×4½"×9") were prepared using the plastic refractories both alone and with 0.2 weight percentage of polypropylene fibers by ramming the plastics into molds with an air hammer.

In the first trial, one block each of KAOLITH 85PB and KAOLITH 85PB refractory with polypropylene fiber was placed in position as a furnace door. The furnace was heated at a rate of 1000° F. per hour to 2500° F. At 2500° F. the furnace temperature was held for 4 hours and then coled at a rate of 300° F. per hour.

In the second trial one block each of KAOLITH 80AS and KAOLITH 80AS refractory with polypropylene fiber was placed in the furnace door. The furnace was fired at a rate of 1500° F. per hour to 2500° F. At 2500° F. the furnace temperature was held for 4 hours and then cooled at a rate of 300° F. per hour.

In a third trial, all four types of bricks were inserted into a furnace held at a temperature of 2500° F. The bricks remained in the furnace for one hour and were then removed.

In both types of tests, the KAOLITH 85PB refractory specimens experienced extensive blistering, a result common to plastic refractories, with the surface being easily fractured. KAOLITH 85PB refractory specimens containing polypropylene fiber experienced blistering to a lesser degree. The KAOLITH 80AS refractory specimens experienced extensive cracking while the KAOLITH 80AS refractory specimens containing polypropylene fiber experienced less cracking.

EXAMPLE 6

Two trials were conducted in an alloy foundry to determine the applicability of this rapid fire technology to induction furnace linings. The trials were conducted in 700 pound capacity and 2500 pound capacity induction furnaces using ramming mix, sold under the trademark MINRO Z 72W by Allied Minerals, and polypropylene fibers. The results showed that not only was preheat time of the green linings drastically reduced, but also that lining life also increased significantly.

Each trial consisted of adding 0.15 weight percent of polypropylene fiber (15 micron × ½ inch) to the ramming mix. This mix contained 3.0 percent moisture and was rammed into place using the standard ramming practice.

Following installation of the lining, the standard procedure for initial heatup involves preheating the green lining with a gas burner, followed by inductively heating a graphite core susceptor, placed in the furnace, with the furnace coil. The standard procedure was altered for the experimental linings. The time required for installation and preheat of the standard linings and the linings incorporating the polypropylene fibers are shown in Table 2.

In the case of the standard lining, following preheat, the furnace is charged with metal scrap and heated to a specific tap temperature. The wear of the lining is determined by the amount of metal needed to fill the furnace. In the case of the lining with polypropylene fibers, the furnace was charged and heated to 3160° F. then cooled to 3000° F. (to meet the specified tap temperature) and tapped. The linings were inspected visually both immediately after the tap and again upon cooling to room temperature. No abnormal signs of wear were detected in the lining with the addition of polypropylene fibers.

TABLE 2

| TIME NEEDED FOR INSTALLATION AND PREHEAT OF INDUCTION FURNACE LININGS | | | | |
|---|---|---|---|---|
| | 700 Pound Capacity Furnace | | 2500 Pound Capacity Furnace | |
| Operation | Standard Lining | Rapid Fire Lining | Standard Lining | Rapid Fire Lining |
| Installation | 1.50 | 1.75 | 3.50 | 4.00 |

TABLE 2-continued

| TIME NEEDED FOR INSTALLATION AND PREHEAT OF INDUCTION FURNACE LININGS | | | | |
|---|---|---|---|---|
| | 700 Pound Capacity Furnace | | 2500 Pound Capacity Furnace | |
| Operation | Standard Lining | Rapid Fire Lining | Standard Lining | Rapid Fire Lining |
| (hours) Gas preheat (hours) | 12.00 | 0.00 | 24.00 | 0.00 |
| Coil preheat (hours) | 6.00 | 1.00 | 12.00 | 0.25 |
| Reduction in Preheat (%) | | 94.40 | | 99.30 |

Each furnace remained in operation for the life of the lining. Table 3 shows the average life for a standard lining versus the life a lining employing the present invention.

TABLE 3

| LENGTH OF SERVICE OF STANDARD AND RAPID-FIRE LININGS | | | | |
|---|---|---|---|---|
| | 700 Pound Capacity Furnace | | 2500 Pound Capacity Furnace | |
| Operation | Standard Lining (Ave.) | Rapid Fire Lining | Standard Lining (Ave.) | Rapid Fire Lining |
| Life (no. of heats) | 22 | 30 | 27 | 42 |
| Improvements of Life (%) | | 36.4 | | 55.6 |

While in accordance with the provisions of the statutes there is illustrated and described herein a specific embodiment of the invention and those skilled in the art will understand that changes may be made in the form of the invention covered by the claims, and that certain features of the invention may sometimes be used to advantage without corresponding use of the other features.

The embodiments of the invention in which an exclusive property or privilege is claimed are defined as follows:

1. The method of removing moisture from a water containing calcium aluminate-bonded refractory mass without explosive spalling comprising the steps of; (a) mixing water, organic fibers and at least one inorganic material to create a refractory mixture, (b) casting, stamping or gunniting the mixture, (c) thereafter curing the mixture and (d) firing the mixture under rapid-fire conditions.

2. The method of removing moisture from a water containing calcium aluminate-bonded refractory mass without explosive spalling comprising the steps of; (a) mixing water, organic fibers and at least one inorganic material to create a refractory mixture (b) ramming the mixture and (c) firing the mixture under rapid fire conditions.

3. The method of removing moisture from a water containing calcium aluminate-bonded refractory mass without explosive spalling according to claim 2 wherein the mixture is a plastic refractory mix.

4. The method of reducing the rebound of a gunnited mixture comprising the steps of;
(a) mixing water, organic fibers and at least one inorganic material to create a refractory mass, and,
(b) gunniting the mixture.

5. The method according to claim 4 wherein the organic fibers are polypropylene fibers.

6. A water containing calcium aluminate-bonded refractory mass of the type used for castables, plastics, ramming mixes and mortars having one or more inorganic materials and a means for removing moisture under rapid-fire conditions therefrom, said means comprising organic fibers randomly distributed throughout the mass and annular channels formed about at least one fiber, said annular channels being of such a size that capillarity exists within the annular channels.

7. A moisture contained calcium aluminate-bonded refractory mass of the type used for castables, plastics, ramming mixes and mortars comprising; (a) one or more inorganic materials and (b) a means for removing the moisture by capillary action therefrom, said means being organic fibers randomly distributed throughout the mass and annular channels formed about at least one organic fiber, whereby rapid-firing of the mass is made possible.

8. The method of removing moisture from a water containing phosphate-bonded refractory mass without explosive spalling comprising the steps of; (a) mixing water, organic fibers and at least one inorganic material to create a refractory mixture, (b) casting, stamping or gunniting the mixture, (c) thereafter curing the mixture, and (d) firing the mixture under rapid-fire conditions such that water is drawn out of said refractory mass by means of capillary action and at higher temperatures said organic fibers decompose to leave channels through which any remaining moisture may escape.

9. The method of removing moisture from a water containing phosphate-bonded high temperature refractory mass without explosive spalling comprising the steps of; (a) mixing water, organic fibers and at least one inorganic material to create a refractory mixture (b) ramming the mixture, and (c) firing the mixture under rapid-fire conditions such that water is drawn out of said refractory mass by means of capillary action and at higher temperatures said organic fibers decompose to leave channels through which any remaining moisture may escape.

10. The method according to claim 9 wherein the mixture is a plastic refractory mixture.

11. A water containing phosphate-bonded high temperature refractory mass of the type used for castables, plastics, and ramming mixes having one or more inorganic materials and a means for removing moisture under rapid-fire conditions therefrom, said means comprising organic fibers randomly distributed throughout the mass and annular channels formed about at least one fiber, said annular channels being of such a size that capillarity exists within the annular channels.

12. A moisture containing phosphate-bonded high temperature refractory mass of the type used for castables, plastics, and ramming mixes comprising; (a) one or more inorganic materials and (b) a means for removing the moisture by capillary action therefrom, said means being organic fibers randomly distributed throughout the mass and annular channels formed about at least one organic fiber, whereby rapid-firing of the mass is made possible.

* * * * *